United States Patent [19]

Eheim

[11] 4,043,713

[45] Aug. 23, 1977

[54] FUEL INJECTION PUMP WITH SCREW CAP INSERT

[75] Inventor: Franz Eheim, Stuttgart, Germany

[73] Assignee: Robert Bosch GmbH, Stuttgart, Germany

[21] Appl. No.: 624,397

[22] Filed: Oct. 21, 1975

[30] Foreign Application Priority Data

Oct. 24, 1974 Germany ............................ 2450521

[51] Int. Cl.[2] .......................... F04B 7/04; F04b 39/10; F16K 15/00

[52] U.S. Cl. ................................ 417/499; 137/543.19; 251/337

[58] Field of Search ......... 417/499; 137/529, DIG. 4, 137/543.19; 251/337, 362; 277/236; 123/139 AF, 139 AP

[56] References Cited

U.S. PATENT DOCUMENTS

| | | | |
|---|---|---|---|
| 957,347 | 5/1910 | Kennedy | 137/DIG. 4 |
| 2,710,023 | 6/1958 | Blackford et al. | 137/543.19 |
| 2,778,339 | 1/1957 | Mancusi | 137/529 |
| 3,002,528 | 10/1961 | Leissner | 137/543.19 |
| 3,082,692 | 3/1963 | Bodzich | 417/499 |
| 3,626,977 | 12/1971 | Riley et al. | 137/543.19 |
| 3,758,241 | 9/1973 | Eheim | 417/499 |
| 3,913,613 | 10/1975 | Kostjunin et al. | 137/529 |

*Primary Examiner*—Carlton R. Croyle
*Assistant Examiner*—Thomas I. Ross
*Attorney, Agent, or Firm*—Edwin E. Greigg

[57] ABSTRACT

The fuel channel leading from the pressure chamber of a fuel injection pump to the injection nozzles includes a volume containing a valve spring and formed by a cap threadedly engaging the valve body. This cap also provides an axial force which clamps internal elements of the valve mechanism into firm and sealing contact. An elastic insert, whose contours are similar to those of the cap, is located within the cap. This insert deforms under the force of the threaded cap and provides an elastic force reservoir which maintains the clamping and sealing force even when the cap is slightly loosened.

1 Claim, 2 Drawing Figures

FUEL INJECTION PUMP WITH SCREW CAP INSERT

BACKGROUND OF THE INVENTION

The invention relates to a fuel injection pump for internal combustion engines including a simultaneously reciprocating and rotating pump piston. The pump piston serves as fuel distributor and its pressure chamber communicates via a pressure valve with a chamber formed by a screw cap which at the same time serves to clamp the valve element onto the injection pump cylinder. In such fuel injection pumps employing screw caps a reliable seal must be provided between the valve element and the screw cap, and between the valve element and the pump cylinder. In most cases the metal-to-metal seal is provided merely by an extremely tight threaded insertion of the screw cap. Inasmuch as the clamped parts are virtually unyielding, even very slight degrees of loosening suffice to break the seal.

OBJECT AND SUMMARY OF THE INVENTION

It is a principal object of the invention to provide a fuel injection pump of the general type described above in which the problems of deteriorating seals do not occur.

This object is attained according to the invention by providing an elastic insert within the screw cap which forms the space containing the movable valve element and which presses the valve body onto the pump cylinder. The inside of this invert also serves as a support for the valve spring. An elastic insert or bushing of this type permits elastic clamping of the valve element onto the pump cylinder so that even if the screw cap is loosened somewhat, the elastic insert is capable of extension to maintain the tension required for a reliable seal. Similar observations apply to the sealing surface between the elastic insert and the valve body.

According to an advantageous embodiment of the invention, the annular edge face of the elastic insert which contacts the valve body is beveled and contributes to a uniform application of force on the valve body and the pump cylinder because the sharp edge formed by the wedge-shaped rim embeds itself into the valve body wherever it is highly loaded. In addition a line contact is easier to seal than a surface contact.

The invention will be between understood as well as further objects thereof will become more apparent from a study of two exemplary embodiments taken in conjunction with the drawing.

DESCRIPTION OF THE PREFERRED EMBODIMENTS

Figure 1:
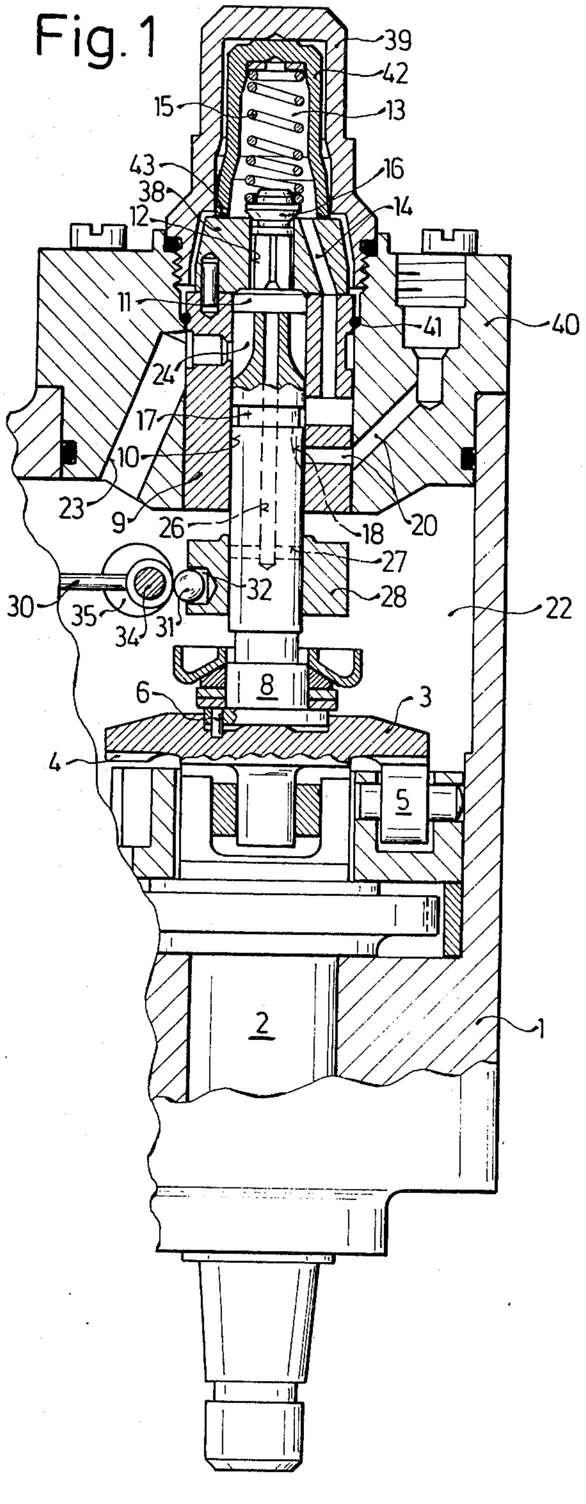
FIG. 1 is a longitudinal section through a fuel injection pump showing a first exemplary embodiment of an elastic insert according to the invention.

FIG. 1 shows a portion of the housing 1 of a fuel injection pump used for multi-cylinder internal combustion engines. Rotatably mounted within the housing is a drive shaft 2 connected with an axial cam plate 3 which has as many cam lobes 4 as corresponds to the number of cylinders in the engine. The axial cam plate 3 is axially reciprocated by rotation through interaction with locally fixed rollers 5. A pump piston 8 which is coupled with the cam plate 3 by a coupling 6 and is pressed on it at least by a spring, is thereby set into a simultaneously rotating and reciprocating motion.

The pump piston 8 operates in a cylindrical bore 10 machined in a cylinder bushing 9 which is closed on top and thereby forms a pressure chamber 11. An axial bore 12 leads from the pressure chamber 11 into a space 13 which is connected via a line 14 with the bore 10 in the cylinder bushing 9. The axial bore 12 may be obturated by a valve member 16 loaded by a spring 15 in the direction of the pressure chamber 11. The connection line 14 terminates radially in the cylinder bore 10 and communicates via an annular groove 17 and a longitudinal groove 18 with individual ones of pressure lines 20 terminating in the bore 10 during each pressure stroke of the pump piston and according to the rotational motion of the pump piston. The number of pressure lines 20 corresponds to the number of engine cylinders and these lines are distributed equally about the cylindrical bore. These pressure lines 20 lead to injection valves (not shown) within the internal combustion engine.

During each compression stroke of the pump piston 8, fuel is delivered through the axial bore, 12, through the open valve member 16, into the chamber 13, through the connection line 14 and the surface groove 18 to one of the pressure lines 20. During the suction stroke of the pump piston, fuel flows from a pump suction chamber 22 through a supply line 23 terminating in the bore 10 and thence via longitudinal grooves 24 on the pump piston and reaches the pressure chamber 11. The number of longitudinal grooves 14 also corresponds to the number of pressure lines 20. During the compression stroke of the pump piston, its rotation interrupts the communication between the supply line 23 and the longitudinal grooves 24 so that the entire fuel quantity delivered by the pump piston is supplied to one of the pressure lines 20, The amount of fuel delivered can be regulated by means of an axial bore 26 within the pump piston 8 which connects the pressure chamber 11 with the pump suction chamber 22 via a transverse bore 27. The axial position of an annular slide 28 moving on the pump piston determines the time during the upward motion of the pump piston 8 at which the transverse bore 27 is opened, thus providing a direct fluid communication between the pressure chamber 11 and the suction chamber 22. From this point on, the fuel supply to pressure line 20 is interrupted. Thus, an adjustment of the axial position of the annular slide 28 may be used to determine and to change the fuel quantity being injected. The axial position of the annular slide 28 is determined by a lever 38 engaging a recess 32 in the slide 28 by means of spherical head 31. The control lever 30 pivots about an axis 34 whose position is adjustable by means of an eccentric insert 35. The other end of the control lever 30 is engaged by a control spring acting in opposition to an r.p.m. sensor. The pre-tension of the control spring is arbitrarily changed by an operating lever. When the r.p.m. increases, the r.p.m. sensor tends to reduce the amount of injected fuel and the spring tends to increase it. The equilibrium position corresponds to a particular injected fuel quantity and can be changed by the operating lever.

The bore 12 which contains the movable valve element 16, as well as a portion of the connecting channel 14, are both contained within a valve sleeve 38 which is clamped onto the face of the cylinder bushing 9 by means of a screw cap 39. The cylinder bushing 9 itself is axially secured within a distributor head 40 belonging to the housing by means of a snap ring 41 and its radial position is assured by a good mechanical fit. The screw cap 39 threaded into the distributor head 40 exerts an axial force on a similarly cap-shaped elastic insert 42 which, in turn, presses the valve sleeve 38 onto the cylindrical bushing 9, thereby forming a tight seal of the commponents.

The edge of the elastic insert 42 facing the valve sleeve 38 is of wedge-shaped or bevelled cross section 43 to insure a better sealing property and also to permit equalization of any possible uneven contact. The elastic insert 42 provides an elastic connection which insures that, even when the screw cap 39 is loosened slightly, the seal between the elastic insert and the valve sleeve as well as the seal between the valve sleeve and the pump cylinder is nevertheless maintained.

Figure 2:
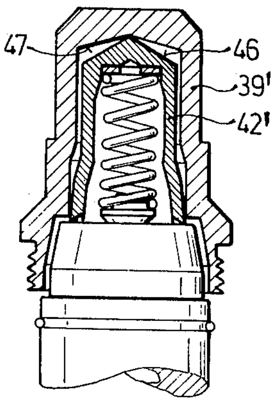
FIG. 2 is a portion of the illustration of FIG. 1 showing an elastic insert according to a second exemplary embodiment of the invention.

In the second exemplary embodiment of the invention according to FIG. 2, the elastic insert as well as the screw cap have conical interior mating surfaces 46 and 47, respectively, of different slope. Thus, as shown, the slope of the cone 47 on the crew cap 39′ is shallower than the corresponding slope of the cone 46 on the elastic insert 42′. This embodiment provides an additional elastic loading of the elastic insert and, in addition, the reduced contact area also reduces the friction encountered during mutual rotation so that a relatively low torque applied to the screw cap 39′ nevertheless produces a high axial force transmitted to the elastic insert 42′.

In both the embodiments of FIGS. 1 and 2 the elastic inserts 42 and 42′ include a lower flared portion terminating in the beveled cross-section 43. The flared portion is provided to improve the elastic properties of the inserts.

1. In a fuel injection pump for an internal combustion engine, said pump including a housing with a cylinder bore, a cylinder bushing within said bore, and a reciprocating and rotating pump piston moving within said cylinder bushing, and further includes a valve sleeve disposed coaxially with said cylinder bushing and containing a spring-loaded valve, a screw cap threadedly engaging said housing and serving as a fuel chamber and for compressing said valve sleeve against said cylinder bushing and against said housing; the improvement comprising:

a substantially cup-shaped elastic insert located coaxially within said screw cap and serving to transmit axial forces from said screw cap to said valve sleeve, said cylinder bushing and said housing and contained within said insert said spring, wherein:

i. said elastic insert has a closed end, remote from said valve sleeve, said closed end being at least partially conical; and ii. said screw cap has an interior end region which is at least partially conical, for engagement with said conical end of said elastic insert, the slope of the conical surface of said screw cap being smaller than the slope of the conical end of said elastic insert.

* * * * *